United States Patent
Hopkins et al.

(10) Patent No.: US 8,479,136 B2
(45) Date of Patent: Jul. 2, 2013

(54) DECOUPLING CAPACITOR INSERTION USING HYPERGRAPH CONNECTIVITY ANALYSIS

(75) Inventors: Jeremy T. Hopkins, Round Rock, TX (US); David A. Papa, Austin, TX (US); Samuel I. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 13/099,767

(22) Filed: May 3, 2011

(65) Prior Publication Data

US 2012/0284676 A1    Nov. 8, 2012

(51) Int. Cl.
*G06F 17/50* (2006.01)

(52) U.S. Cl.
USPC .......................................................... 716/122

(58) Field of Classification Search
USPC .......................................................... 716/122
See application file for complete search history.

(56) References Cited

U.S. PATENT DOCUMENTS

| | | | |
|---|---|---|---|
| 6,763,509 B2 | 7/2004 | Korobkov | |
| 6,789,241 B2 | 9/2004 | Anderson et al. | |
| 6,898,769 B2 | 5/2005 | Nassif et al. | |
| 7,600,208 B1 * | 10/2009 | Sharma et al. | 716/120 |
| 7,844,438 B1 * | 11/2010 | Verghese et al. | 703/14 |
| 2002/0144217 A1 | 10/2002 | Lin et al. | |
| 2005/0269599 A1 | 12/2005 | Huang et al. | |

OTHER PUBLICATIONS

Su et al., "Optimal Decoupling Capacitor Sizing and Placement for Standard Cell Layout Designs," Computer-Aided Design of Integrated Circuits and Systems, IEEE Transactions, vol. 22, issue 4, pp. 428-436 (Apr. 2003).

Fan et al., "Partitioning-Based Decoupling Capacitor Budgeting Via Sequence of Linear Programming," Integration, The VLSI Journal, vol. 40, issue 4, pp. 516-524 (Jul. 2007).

* cited by examiner

*Primary Examiner* — Jack Chiang
*Assistant Examiner* — Brandon Bowers
(74) *Attorney, Agent, or Firm* — Matthew W. Baca; Jack V. Musgrove (57) ABSTRACT

Decoupling capacitors (dcaps) are placed in an IC design by assigning different dcap utilization rates to logic cones, applying the rates to corresponding dcap regions surrounding cells in the cones, identifying any overlap of regions from different logic cones, and inserting a dcap at the overlapping region having the highest dcap utilization rate. The best location for the dcap is computed using a hypergraph wherein the cells are edges and the regions are nodes. Any node that is dominated by another node is removed and its edge is extended to the dominating node. The dcap is inserted in the region having the most edges (the edges can be weighted). The process is repeated iteratively, updating the hypergraph by removing nodes connected to dcap location, and inserting the next dcap at a region corresponding to the node which then has the greatest number of connected edges.

21 Claims, 7 Drawing Sheets

DECOUPLING CAPACITOR INSERTION USING HYPERGRAPH CONNECTIVITY ANALYSIS

BACKGROUND OF THE INVENTION

1. Field of the Invention

The present invention generally relates to the design of semiconductor chips and integrated circuits, and more particularly to a method of inserting decoupling capacitors in an integrated circuit design.

2. Description of the Related Art

Integrated circuits are used for a wide variety of electronic applications, from simple devices such as wristwatches, to the most complex computer systems. A microelectronic integrated circuit (IC) chip can be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells.

An IC chip is fabricated by first conceiving a logical (behavioral) description for the circuit, and converting that logical description into a physical description, or geometric layout. This process is carried out in steps, such as first generating a register-transfer level (RTL) description of the circuit based on the logical description, and then using logic synthesis to derive a gate level description or "netlist." A netlist is a record of all of the nets (interconnections) between cell pins, including information about the various components such as transistors, resistors and capacitors. The circuit layout is then checked to insure that it meets all of the design requirements, particularly timing requirements, and may go through several iterations of analysis and refinement.

Cell placement in semiconductor fabrication involves a determination of where particular cells should optimally (or near-optimally) be located in a layer of an integrated circuit device. Due to the large number of components and the details required by the fabrication process for very large scale integrated (VLSI) devices such as microprocessors and application-specific integrated circuits (ASICs), physical design is not practical without the aid of computers. As a result, most phases of physical design extensively use computer-aided design tools, and many phases have already been partially or fully automated. Automation of the physical design process has increased the level of integration, reduced turn around time and enhanced chip performance. Several different hardware description programming languages (HDL) have been created for electronic design automation, including Verilog, C, VHDL and TDML. A typical electronic design automation system receives one or more high level behavioral descriptions of an IC device, and translates this high level design language description into netlists of various levels of abstraction.

One problem that has arisen in these modern electronic devices relates to noise in the power grid of the device. Substantial noise is generated in an integrated circuit chip as digital electronic functions are interconnected or decoupled. The power grid provides the power and ground signals throughout the chip, and these are among the most important signals to control reliably, since supply voltage variations can lead not only to problems related to spurious transitions in some cases (particularly when dynamic logic is used), but also to delay variations and timing unpredictability. Even if a reliable supply is provided at an input pin of a chip, it can deteriorate significantly within the chip due to imperfections in the conductors that transmit these signals throughout the chip.

Noise in modern electronic circuits is particularly troublesome as it increases the requirements on the noise margins and other circuit parameters. Noise margins have been greatly reduced in modern designs due to the lowering of supply voltages and the presence of a larger number of potential noise generators. With technology scaling, the trend for high performance integrated circuits is toward every higher operating frequencies, lower supply voltages, and higher power dissipation. These features cause a dramatic increase in the currents being delivered through the on-chip power grid.

One solution to this problem lies in the use of decoupling capacitors. On-chip decoupling capacitors (dcaps) attached to the power grid can reduce power supply induced noise. For example, in a CMOS reduced instruction set computing (RISC) microprocessor design, as much as 160 nF of on-chip decoupling capacitance may be added to control power supply noise. In another example, the on-chip decoupling capacitance may be sized at ten times that of the total active circuit switching capacitance. The closer decoupling capacitors can be placed in relation to the noise source (such as a switching transistor), the more effective the decoupling will be, primarily due to a decreased inductance in series with the decoupling capacitance. Decoupling capacitors may be provided underneath devices at the surface of an integrated circuit, or distributed in a carrier of the chip. Decoupling capacitors also provide a key benefit of power savings by removing the superimposed signal from the power rail.

Figure 1:
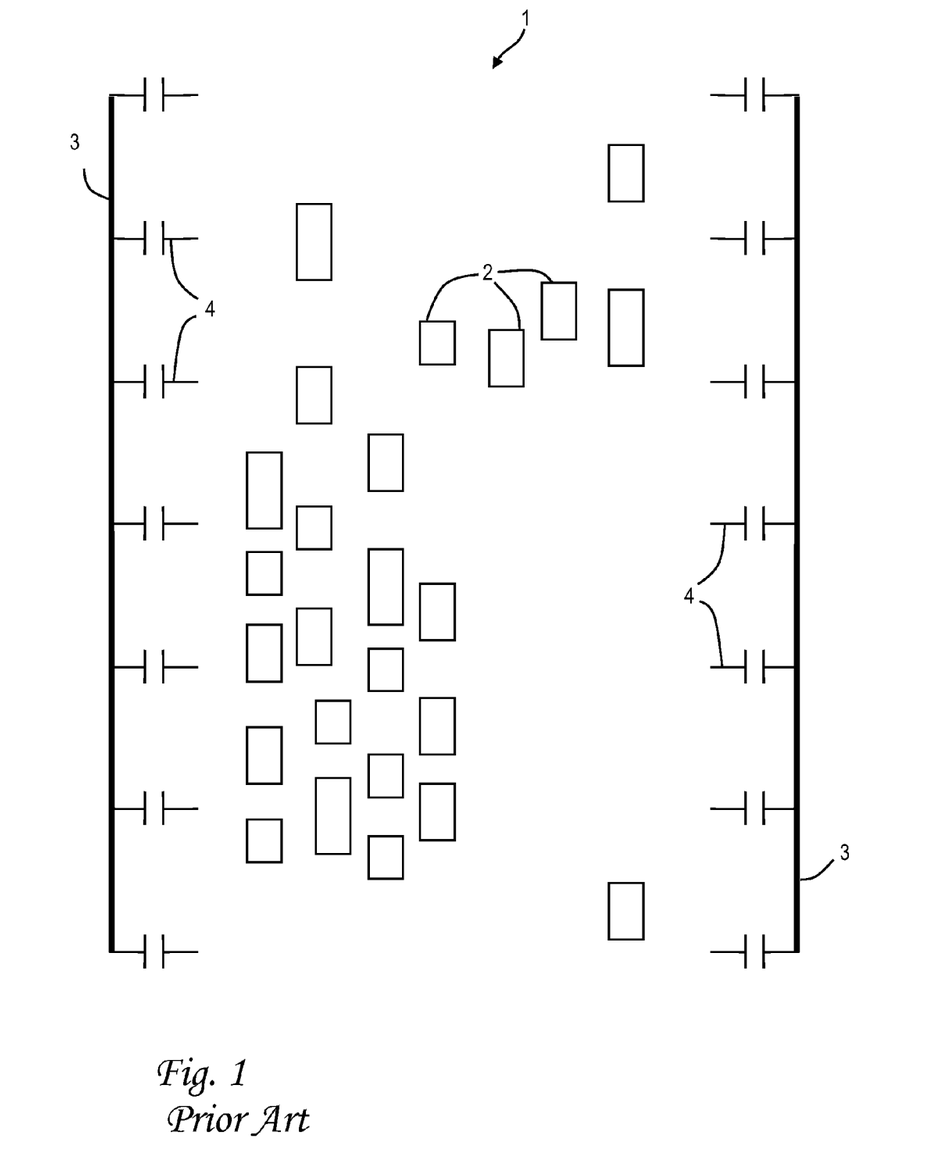
FIG. 1 is a plan view of an integrated circuit layout illustrating dcaps conventionally placed at regular intervals along power rails.

Dcaps are generally evenly placed based on some percentage set by the design team along a fixed grid, as illustrated in FIG. 1 for an exemplary layout 1 of circuit elements or cells 2. Two parallel power rails 3 are provided along either side of layout 1, and dcaps 4 are placed at regular intervals along power rails 3. The problem with this approach is that the resulting dcap placement is not necessarily ideal based on the locations of the logic gates, and can negatively impact overall placement results such as timing.

Figure 2:
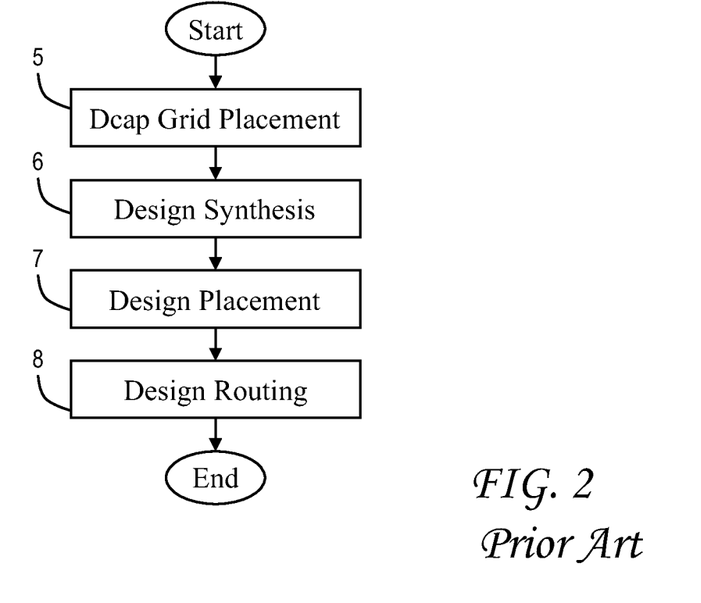
FIG. 2 is a chart illustrating the logical flow for a conventional integrated circuit design process which includes grid placement of dcaps.

In a traditional synthesis environment as exemplified by FIG. 2, dcap insertion has typically been a pre-placement procedure. The design process begins with the dcap grid placement 5. After dcap grid placement, design synthesis 6 and design placement 7 are carried out. Synthesis and design may be integrated in placement-directed synthesis to overcome problems in achieving timing closure, including for example technology mapping, physical placement, electrical correction, and timing legalization. The process ends with design routing (wiring) to properly connect the placed components while obeying all design rules for the integrated circuit 8. It is impossible to optimize dcap placement in this process since the dcaps are all inserted prior to placement of the circuit elements in the geometric layout.

As an alternative to the methodology of FIG. 2, dcaps may be inserted once the design process is substantially complete (including synthesis, placement, and physical design). Existing tools can highlight areas or nets that appear to be particularly sensitive to coupling or which may create coupling problems. Dcaps can then be inserted at those areas, but this ad hoc approach severely limits placement to available locations. This approach is also manually intensive.

In light of the foregoing, it would be desirable to devise a more flexible method of dcap placement which could take the logic layout into consideration. It would be further advantageous if the method could integrate dcap insertion into the full automated flow for physical synthesis to achieve improved timing results.

SUMMARY OF THE INVENTION

It is therefore one object of the present invention to provide an improved method of placing dcaps in an integrated circuit design.

It is another object of the present invention to provide such a method which more accurately places dcaps proximate critical logic.

It is yet another object of the present invention to provide enhanced designer control over dcap locations for specifically designated logic of the integrated circuit design.

The foregoing objects are achieved in a method of placing dcaps in an integrated circuit design, by receiving a description of the integrated circuit design which includes a plurality of logic cones in a layout, associating candidate dcap regions in the layout with functional cells in the logic cones, identifying an overlap of candidate dcap regions associated with functional cells in different logic cones, and inserting a dcap at one of the candidate dcaps regions which forms the overlap. In the preferred implementation different dcap insertion rates are assigned to the different logic cones, and the dcap is inserted in a candidate dcap region forming the overlap which has a higher dcap insertion rate. Regions may be considered as overlapping if some user-defined value (e.g., at least 50%) of the area of each region is included in the overlap. In an exemplary embodiment four candidate dcap regions can be defined for each functional cell, being generally rectangular and forming a ring surrounding a central block in the layout representing the functional cell (or a bounding box for circuit elements that make up the cell). In a further implementation, the best location for the dcap is computed using a hypergraph. The hypergraph is built by adding an edge to the hypergraph for each of the functional cells, adding a node to the hypergraph for each of the candidate dcap regions wherein a given node is initially connected to one of the edges corresponding to the functional cell associated with the candidate dcap region corresponding to the given node, removing any node from the hypergraph that corresponds to a candidate dcap region which overlaps another candidate dcap region having a higher dcap insertion rate (a dominating node). Any edge previously connected to a removed node is connected to the dominating node. The dcap is then inserted in the candidate dcap region corresponding to the node having the greatest number of connected edges. Any edge that corresponds to a functional cell whose four candidate dcap regions are all dominated can be removed from the hypergraph.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 3:
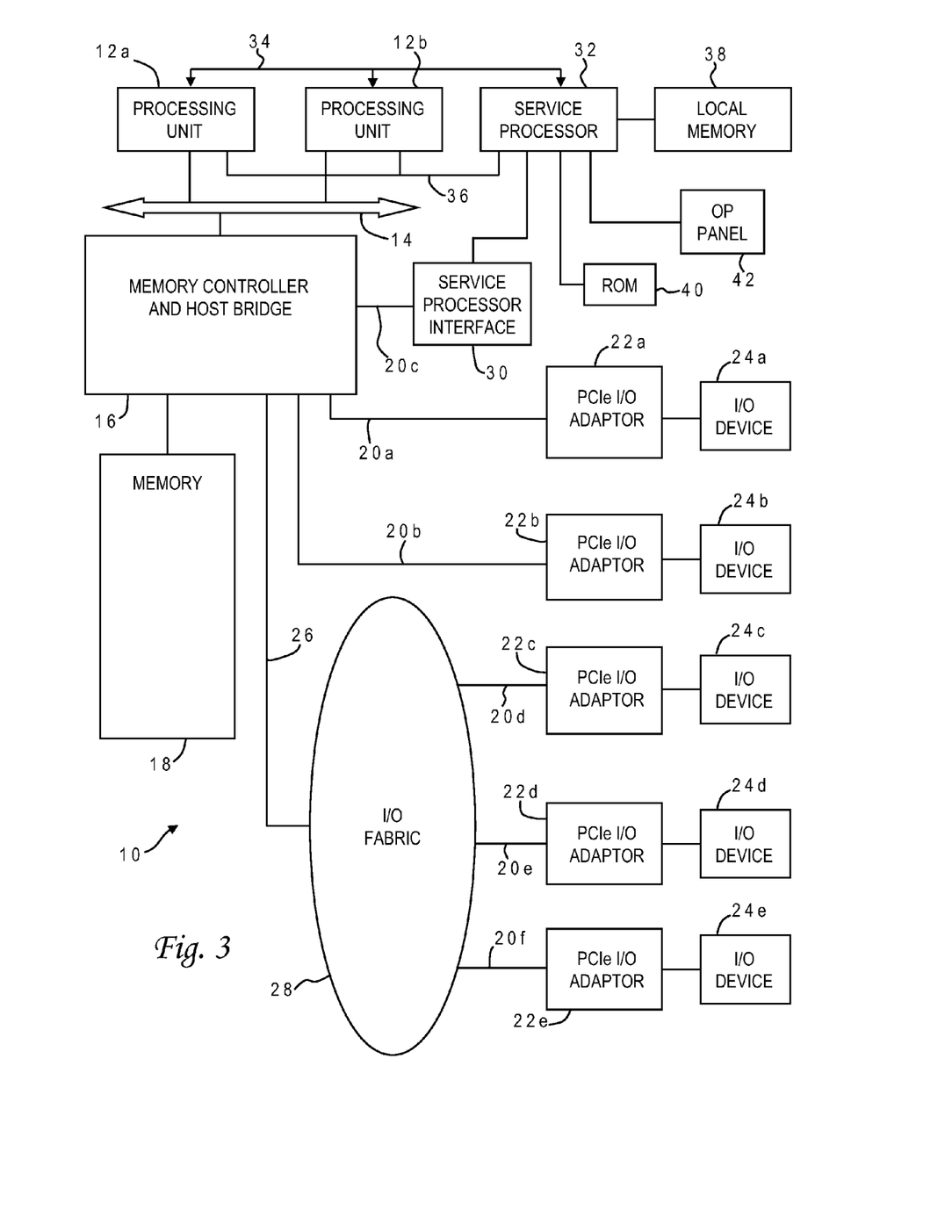
FIG. 3 is a block diagram of a computer system programmed to carry out integrated circuit design in accordance with one embodiment of the present invention.

With reference now to the figures, and in particular with reference to FIG. 3, there is depicted one embodiment 10 of a computer system in which the present invention may be implemented to carry out the design of an integrated circuit. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forward to MC/HB 16 if it does not involve cache-coherent memory transfers. Switch 28 is shown as a separate logical component but it could be integrated into MC/HB 16.

In this embodiment PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code service processor 32 may enter a mode of monitoring and reporting any operating parameters or errors, such as the fooling fan speed and operation, thermal sensors, power supply regulators, and recoverable and non-recoverable errors reported by any of processors 12a, 12b, memory 18, and MC/HB 16. Service processor 32 may take further action based on the type of errors of defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a novel dcap insertion technique as part of an overall circuit design process. Accordingly, a program embodying the invention may include conventional aspects of various circuit design tools, and these details will become apparent to those skilled in the art upon reference to this disclosure.

Figure 4:
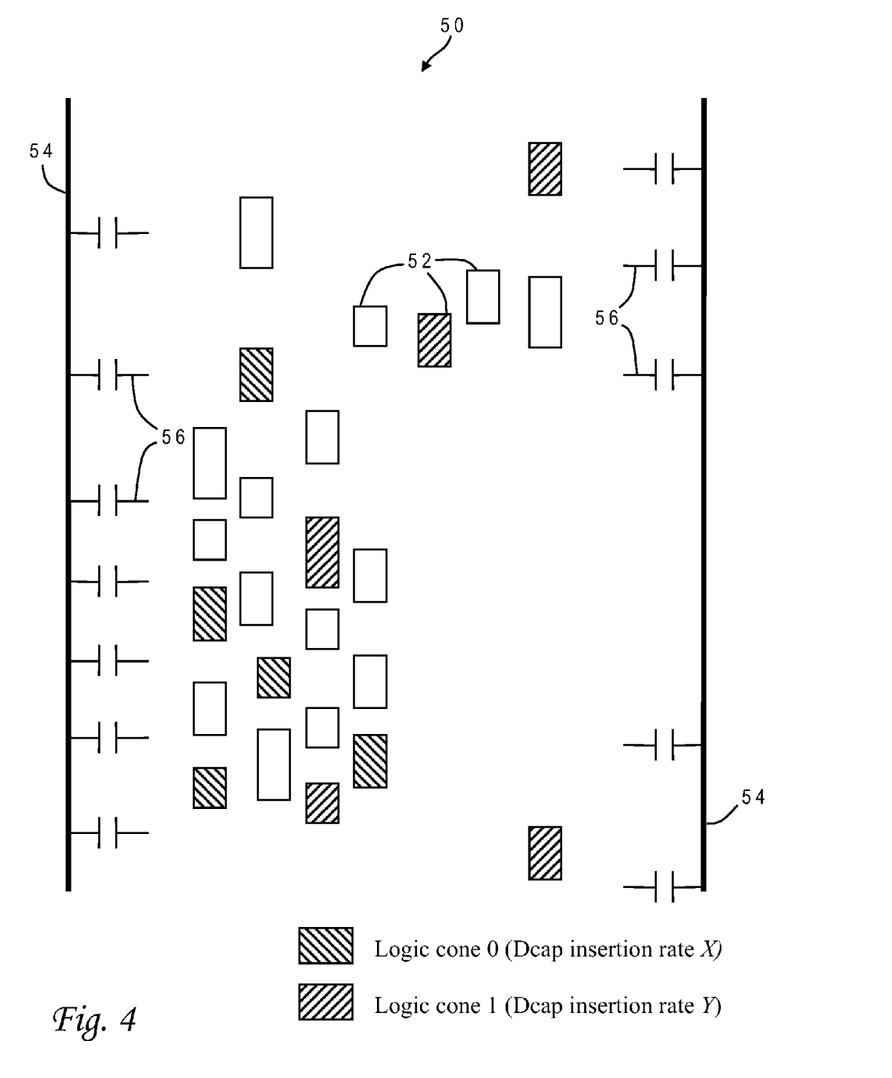
FIG. 4 is a plan view of an integrated circuit layout illustrating logic cones which are assigned different dcap insertion rates in accordance with one implementation of the present invention.

Referring now to FIG. 4, there is depicted a simplified layout 50 of an integrated circuit design, or portion thereof such as a macro, which may be enhanced by inserting dcaps in accordance with an exemplary application of the present invention. Layout 50 includes a plurality of cells having various sizes and functions according to the intended use of the integrated circuit. The cells can be laid out in an orthogonal coordinate system using horizontal and vertical tracks to provide interconnections between the cells. Layout 50 may be one layer of a multi-layer macro or integrated circuit design. Layout 50 is simplified in that it shows a relatively small number of cells and tracks. State of the art designs for microprocessors and application-specific integrated circuits (ASICs) can have thousands of cells with hundreds of tracks. Computer system 10 can receive a circuit description for layout 50 in the form of a hardware description language (HDL) file created by a designer or an electronic design automation tool. Layout 50 may be an initial layout for the integrated circuit design, or may be a layout resulting from one or more iterations of cell placement and circuit wiring, or other physical design steps.

Certain cells in layout 50 can be logically associated according to their related functionality. A group of such related cells is referred to as a logic cone. A logic cone is basically a schematic fragment, and can be any set of circuitry or logic devices, usually bounded by timing points such as registers, primary inputs/outputs, or black boxes. For example, a single logic cone may comprise multiple input latches connected to combinational logic cells which are further connected to output latches. A logic cone generally does not refer to the geometry of the physical design, and no such limitation should be inferred. The circuit designer can manually identify logic cones in the design, or the automated design tool can be programmed to define logic cones based on interconnection rules. The HDL file initially received by computer system 10 can include an identification of logic cones within the integrated circuit design.

FIG. 4 illustrates two logic cones in the integrated circuit design comprising two sets of cells 52 having different hashing. The present invention uses cone-aware placement to provide improved location of dcaps, that is, the invention takes into consideration that different cells in a layout are part of different logic cones. As explained below, the present invention can further enhance dcap placement by assigning different dcap insertion rates or weightings to different logic cones. In the example of FIG. 4, logic cone 0 has been assigned a dcap insertion rate of X, while logic cone 1 has been assigned a dcap insertion rate of Y, where X≠Y. Dcap insertion rates can be assigned manually by the designer or automatically by the placement tool based on previous settings associated with different cells or cone types. A default dcap insertion rate may be applied globally with the designer changing the rate only for critical logic. The dcap insertion rate assigned to a particular logic cone applies to all cells within that cone. If a single cell is included in more than one cone (for example, an output latch of a first logic cone is also an input latch to a second logic cone), it can assume the greatest value for the dcap insertion rate assigned to either of the logic cones. As explained further below, cone-aware placement of dcaps results in an optimized dcap layout with more dcaps closer to critical logic. This enhancement is seen in FIG. 4 by the locations of dcaps 56 along power rails 54. Dcaps 56 are now focused in the regions where more logic is located (containing higher utilization rates).

Figure 5:
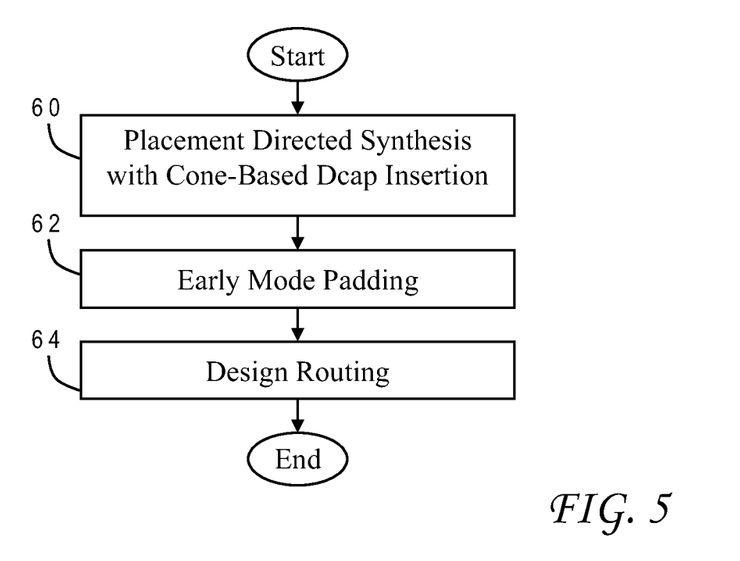
FIG. 5 is a chart illustrating the logical flow for an integrated circuit design process according to one implementation of the present invention wherein placement-directed synthesis includes dcap insertion.

The present invention may be further enhanced by modifying the conventional design flow to enable cone-based dcap insertion during placement directed synthesis, as depicted in FIG. 5. According to this implementation, the process begins with placement directed synthesis which can be carried out by computer system 10, and may include traditional components such as technology mapping, physical placement of functional cells, electrical correction, and timing legalization (60). These components can be iteratively repeated. The present invention can include cone-based dcap insertion with these iterations. Computer system 10 can dynamically change the dcap locations based on changes in placement of logic cones or changes in dcap insertion rates, subject to constraints such as the location and orientation (horizontal/vertical) of the power rails which may also change. This flexibility allows the present invention to target higher coupled circuits and bias placement towards those circuits to offer better decoupling results. After placement directed synthesis is complete, including dcap insertion, the process continues with early mode padding (62), followed by design routing (64). Early mode padding refers to insertion of delay cells (pads) along faster paths in the circuit design in order to correct early-mode timing violations. An illustrative design process according to the present invention may include other elements not shown, such as refinement using move-bounded placement and buffer optimization.

Figure 6:
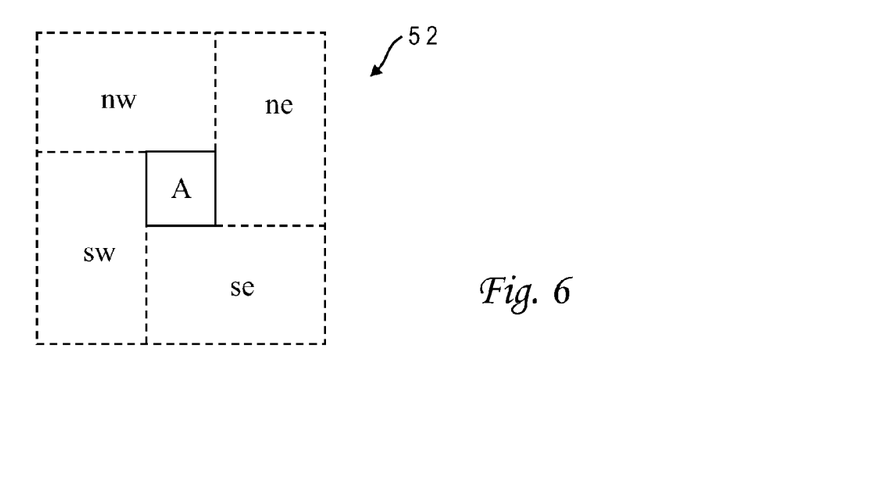
FIG. 6 is a pictorial representation of a cell in an integrated circuit design, the cell having surrounding regions in which dcaps may be placed in accordance with one implementation of the present invention.

With further reference to FIG. 6, the present invention contemplates defining a plurality of dcap regions that surround a given cell for which dcap insertion may be desired (i.e., any cell with a dcap insertion rate greater than zero). In the illustrative implementation, four dcap regions are defined which are generally rectangular and equal-sized, forming a ring around a central block representing the associated functional cell 52. The block may represent a bounding box for circuit elements that make up the cell, or may be a specific circuit element such as a gate. These regions may be labeled using compass directions for ease (northeast, northwest, southeast, southwest), so cell A has four dcap regions denoted A:ne, A:nw, A:se, A:sw. The specific size of a dcap region can preferably be adjusted by the designer.

The use of rectangles is exemplary and should not be construed in a limiting sense, although it is particularly useful for Manhattan layouts. The reference to compass directions is similarly not restrictive as these terms are merely based on an arbitrary orientation of the circuit layout as presented to the designer. Other schemes may be employed to define multiple regions surrounding a node including other region shapes (e.g., parallelograms) or more than four regions (e.g., six surrounding hexagons).

Figure 7:
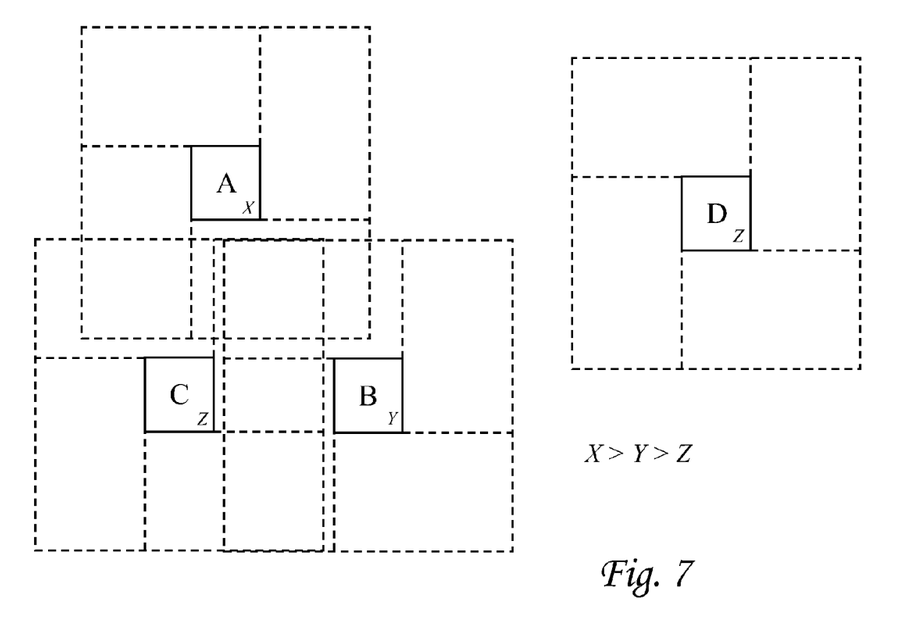
FIG. 7 is a conflict graph constructed in accordance with one implementation of the present invention, for a layout example having four cells wherein three of the cells have overlapping dcap regions.

These dcap regions are defined for each of the cells in the different logic cones designated in the integrated circuit description, and are used to create a conflict graph for cells in a given placement area as shown in FIG. 7. The placement area may be the entire layout, a portion thereof such as a bin derived from a partitioning process, or a bounding box of a logic cone. In the simplified example of FIG. 7 there are four cells A, B, C, and D in the bin, each having four surrounding dcap regions using the model of FIG. 6. Cells A, B and C are also in different logic cones which have been assigned different dcap insertion rates. Cell A is in a logic cone which is assigned a dcap insertion rate X. Cell B is in a logic cone which is assigned a dcap insertion rate Y. Cell C is in a logic cone which is assigned a dcap insertion rate Z. Cell D is in the same logic cone as cell C and so is assigned the dcap insertion rate Z as well. Further to this example, X is the largest dcap insertion rate and Z is the smallest dcap insertion rate, i.e., X>Y>Z.

The present invention selects a region for dcap insertion by first identifying any overlapping portions of dcap regions for cells in different logic cones. In FIG. 4 cells A, B and C each have overlapping portions, while cell D does not overlap with any other cell. Computer system 10 is programmed to select the region presenting the largest conflict (overlap) for dcap insertion, subject to dominating dcap insertion rates. This selection process can be carried out using a hypergraph such as that seen in FIG. 8. A hypergraph is a generalization of a graph, having a set of vertices or nodes, and a set of connections or edges which link the nodes. In the context of the present invention, the hypergraph nodes represent candidate dcap locations while the edges represent functional cells. The hypergraph can be built one cell at a time. Each possible dcap region for the first cell in the bin is assigned to a node and added to the graph, with the cell edge connecting the nodes. When another cell is added, any region of any cell that is dominated by a region of another cell is removed. The edge previously connected to the removed node is then connected to the conflicting (dominating) node.

Figure 8:
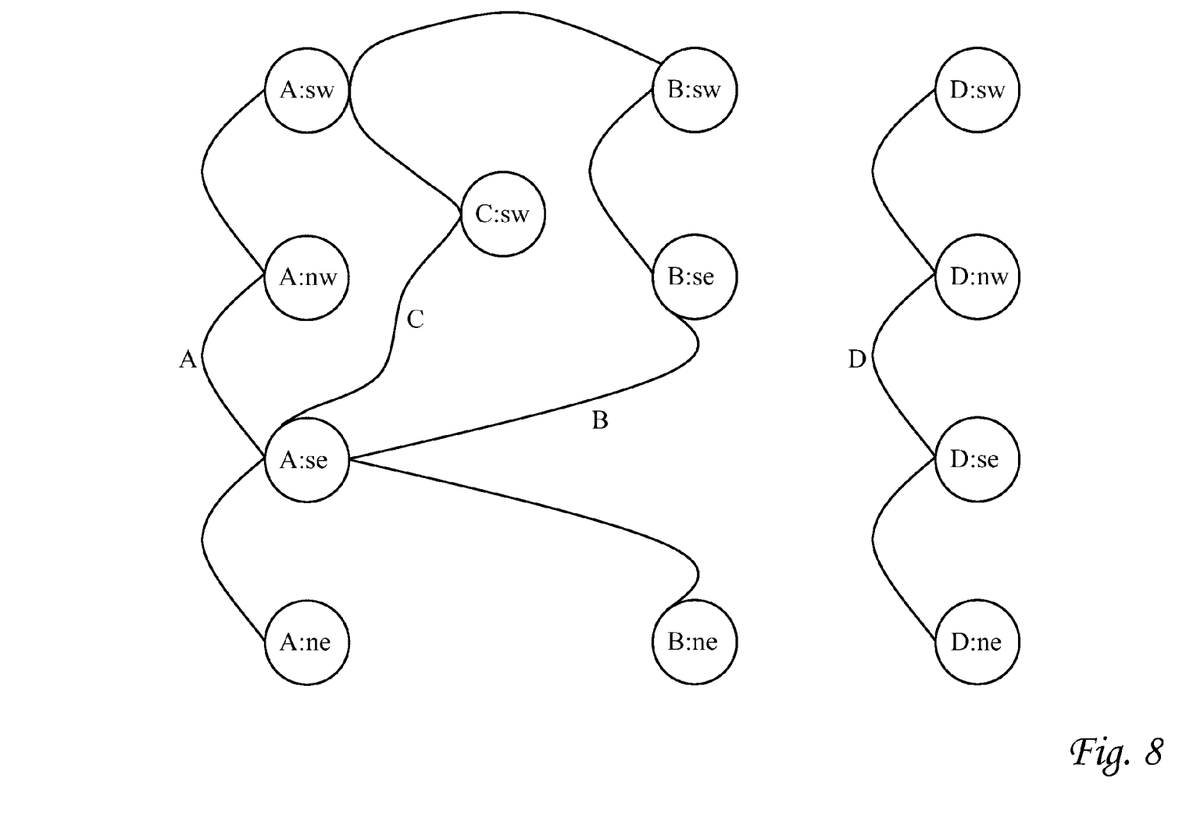
FIG. 8 is a hypergraph with nodes corresponding to the dcap regions shown in FIG. 7, after removing dominated dcap regions in accordance with one implementation of the present invention.

Designers can choose different metrics to determine dominance, but in the preferred implementation a first region is considered to be dominated by a second region if some user-defined value, e.g., at least 50% of the cell regions overlap in area and the second region is assigned a higher dcap weighting than the first region. If a cell is dominated by other cells in all four of its surrounding regions, that cell is considered redundant and its corresponding edge can be completely removed from the hypergraph.

Thus, in the example of FIG. 7 when cell B is added to the hypergraph, node B:nw is omitted because it overlaps with node A:se more than 50%, and cell A has a higher dcap insertion rate (X) that cell B (Y). In other words, node A:se dominates node B:nw. Edge B is then connected to node A:se. When cell C is added to the hypergraph, node C:ne is removed because it overlaps with and is dominated by node A:se (X>Z). Node C:nw is removed because it overlaps with and is dominated by node A:sw. Node C:se is removed because it overlaps with and is dominated by node B:sw (Y>Z). Edge C is accordingly extended to nodes A:se, A:sw and B:sw. When cell D is added to the hypergraph, the existing edges and nodes are unaffected because there is no overlap with cell D. The final result once all cells have been added is graphically depicted in FIG. 5.

Upon completion of the hypergraph, the node with the most vectors (edges) indicates the best position to insert the dcap. This position will always be in one of the dcap regions which forms the overlap. In an alternative implementation the edges can be weighted according to designer preference, and the dcap is inserted at the node having the greatest weighted edge value. When that dcap is inserted into the circuit description, all dependent (connected) nodes are removed from the hypergraph. If there is a tie between multiple nodes having the greatest number of edges, any of those nodes can be randomly selected from dcap insertion. The process can be repeated iteratively until there are no nodes remaining. Dcap insertion may be subject to some cap such as a globally defined limit or percentage.

For the example of FIGS. 7 and 8, the largest conflict occurs at node A:se, having three edges. The process therefore places the first dcap location in this region. Since node A:se is connected to all of the other B and C nodes, those nodes are all removed leaving only the D nodes. In the next iteration, a second dcap is accordingly placed at any one of the nodes D:sw, D:nw, D:se, D:ne, completing the process.

Figure 9:
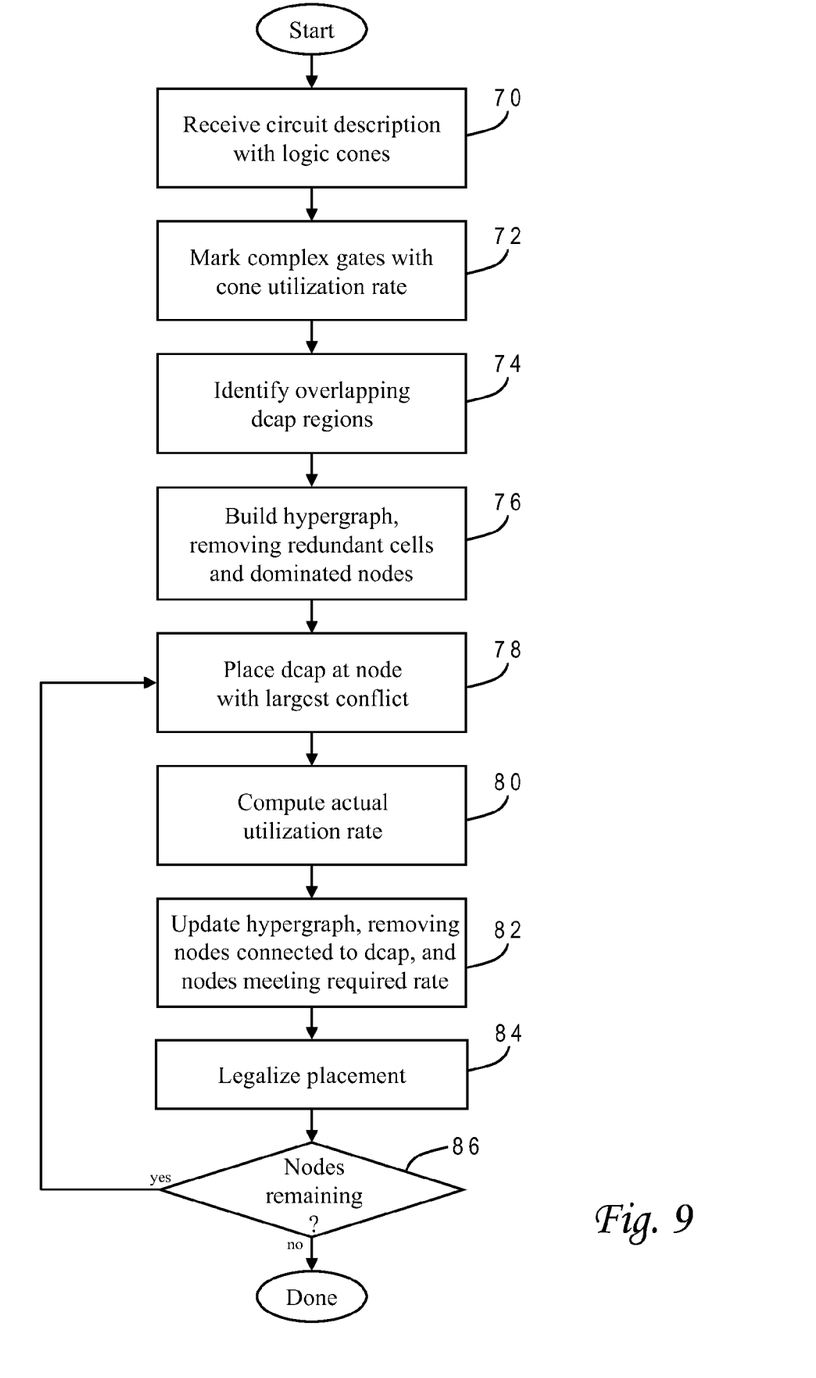
FIG. 9 is a chart illustrating the logical flow for dcap placement in accordance with one implementation of the present invention.

The invention may be further understood with reference to the flow chart of FIG. 9 illustrating a preferred process for dcap placement. The process begins by receiving the circuit description, including identification of logic cones (70). Each complex gate is assigned a dcap utilization rate corresponding to the cone it is in (72). Any regions which have more than a 50% area overlap are noted (74). A hypergraph is created for the placement area using a model which provides candidate dcap locations surrounding each cell, removing redundant cells and nondominating regions based on dcap utilization rates (76). A dcap is then placed in the circuit description at the candidate region having the greatest conflict (78). The actual dcap utilization rate for each cone is computed (80). The hypergraph is updated by removing that node of greatest conflict and all connected nodes, and further removing nodes of any cells now meeting the required utilization rate (82). The dcap placement is then legalized, i.e., dcaps are moved to locations in the layout that are actually available subject to the presence of other objects and design constraints (84). A check is made to see if there are still nodes remaining in the hypergraph (86). If so, the process repeats iteratively at box 78, otherwise the process is complete. The method of the present invention thereby provides for dcap insertion based on localized placement utilization, allowing for more flexible placement compared to prior art dcap grids and resulting in improved results such as timing. The method is easily integrated into the full automated flow for integrated circuit design tools.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer-implemented method of placing dcaps in an integrated circuit design, comprising:

receiving a description of the integrated circuit design which includes a plurality of logic cones in a layout, by executing first program instructions in a computer system;
associating candidate dcap regions in the layout with functional cells in the logic cones, by executing second program instructions in the computer system;
identifying an overlapping portion of candidate dcap regions associated with functional cells in different logic cones, by executing third program instructions in the computer system; and
inserting, in the description of the integrated circuit design, a dcap at one of the candidate dcap regions which forms the overlapping portion, by executing fourth program instructions in the computer system.

2. The method of claim 1 wherein the overlapping portion includes a user-defined value of the area of a first candidate dcap region associated with a first one of the functional cells in a first one of the logic cones, and includes the user-defined value of the area of a second candidate dcap region associated with a second one of the functional cells in a second one of the logic cones.

3. The method of claim 1 wherein said associating defines four candidate dcap regions for a given functional cell, the four candidate dcap regions being generally rectangular and forming a ring surrounding a central block in the layout representing the given functional cell.

4. The method of claim 1, further comprising:
assigning a first dcap insertion rate to a first one of the different logic cones which includes a first one of the functional cells having a first one of the candidate dcap regions forming the overlapping portion; and
assigning a second dcap insertion rate to a second one of the different logic cones which includes a second one of the functional cells having a second one of the candidate dcap regions forming the overlapping portion, the second dcap insertion rate being less than the first dcap insertion rate;
wherein said inserting places the dcap in the first candidate dcap region.

5. The method of claim 1 further comprising:
assigning at least two different dcap insertion rates to the different logic cones;
applying the different dcap insertion rates to the candidate dcap regions based on which logic cone contains the functional cell associated with the candidate dcap region; and
constructing a hypergraph by
adding an edge to the hypergraph for each of the functional cells,
adding a node to the hypergraph for each of the candidate dcap regions, a given node being initially connected to one of the edges corresponding to the functional cell associated with the candidate dcap region corresponding to the given node,
removing any node from the hypergraph that corresponds to a candidate dcap region which overlaps another candidate dcap region having a higher dcap insertion rate, and
connecting any edge previously connected to a removed node to the node corresponding to the candidate dcap region having the higher dcap insertion rate;
wherein said inserting places the dcap in the candidate dcap region corresponding to one of the nodes having the greatest number of connected edges.

6. The method of claim 5 wherein the hypergraph is further constructed by removing any edge from the hypergraph that corresponds to a functional cell whose associated candidate dcap regions all overlap other candidate dcap regions having higher dcap insertion rates.

7. The method of claim 5 wherein the dcap is a first dcap, and further comprising:
updating the hypergraph by removing all nodes having edges connected to the node corresponding to the candidate dcap region in which the first dcap is inserted; and
inserting, in the description of the integrated circuit design, a second dcap at another candidate dcap region corresponding to another one of the nodes which has the greatest number of connected edges after said updating.

8. A computer system comprising:
one or more processors which process program instructions;
a memory device connected to said one or more processors; and
program instructions residing in said memory device for placing dcaps in an integrated circuit design by receiving a description of the integrated circuit design which includes a plurality of logic cones in a layout, associating candidate dcap regions in the layout with functional cells in the logic cones, identifying an overlapping portion of candidate dcap regions associated with functional cells in different logic cones, and inserting in the description of the integrated circuit design a dcap at one of the candidate dcap regions which forms the overlapping portion.

9. The computer system of claim 8 wherein the overlapping portion includes a user-defined value of the area of a first candidate dcap region associated with a first one of the functional cells in a first one of the logic cones, and includes the user-defined value of the area of a second candidate dcap region associated with a second one of the functional cells in a second one of the logic cones.

10. The computer system of claim 8 wherein four candidate dcap regions are defined for a given functional cells, the four candidate dcap regions being generally rectangular and forming a ring surrounding a central block in the layout representing the given functional cell.

11. The computer system of claim 8 wherein said program instructions further assign a first dcap insertion rate to a first one of the different logic cones which includes a first one of the functional cells having a first one of the candidate dcap regions forming the overlapping portion, and assign a second dcap insertion rate to a second one of the different logic cones which includes a second one of the functional cells having a first one of the candidate dcap regions forming the overlapping portion, the second dcap insertion rate being less than the first dcap insertion rate, wherein the dcap is inserted in the first candidate dcap region.

12. The computer system of claim 8 wherein said program instructions further assign at least two different dcap insertion rates to the different logic cones, apply the different dcap insertion rates to the candidate dcap regions based on which logic cone contains the functional cell associated with the candidate dcap region, and construct a hypergraph by:
adding an edge to the hypergraph for each of the functional cells;
adding a node to they hypergraph for each of the candidate dcap regions, a given node being initially connected to one of the edges corresponding to the functional cell associated with the candidate dcap region corresponding to the given node;

removing any node from the hypergraph that corresponds to a candidate dcap region which overlaps another candidate dcap region having a higher dcap insertion rate; and connecting any edge previously connected to a removed node to the node corresponding to the candidate dcap region having the higher dcap insertion rate, wherein said inserting places the dcap in the candidate dcap region corresponding to one of the nodes having the greatest number of connected edges.

13. The computer system of claim 12 wherein the hypergraph is further constructed by removing any edge from the hypergraph that corresponds to a functional cell whose associated candidate dcap regions all overlap other candidate dcap regions having higher dcap insertion rates.

14. The computer system of claim 12 wherein the dcap is a first dcap, and said program instructions further update the hypergraph by removing all nodes having edges connected to the node corresponding to the candidate dcap region in which the first dcap is inserted, and insert in the description of the integrated circuit design a second dcap at another candidate dcap region corresponding to another one of the nodes which has the greatest number of connected edges after updating the hypergraph.

15. A computer program product comprising:
a computer-readable storage medium; and
program instructions residing in said storage medium for placing dcaps in an integrated circuit design by receiving a description of the integrated circuit design which includes a plurality of logic cones in a layout, associating candidate dcap regions in the layout with functional cells in the logic cones, identifying an overlapping portion of candidate dcap regions associated with functional cells in different logic cones, and inserting in the description of the integrated circuit design a dcap at one of the candidate dcap regions which forms the overlapping portion.

16. The computer program product of claim 15 wherein the overlapping portion includes a user-defined value of the area of a first candidate dcap region associated with a first one of the functional cells in a first one of the logic cones, and includes the user-defined value of the area of a second candidate dcap region associated with a second one of the functional cells in a second one of the logic cones.

17. The computer program product of claim 15 wherein four candidate dcap regions are defined for a given functional cell, the four candidate dcap regions being generally rectangular and forming a ring surrounding a central block in the layout representing the given functional cell.

18. The computer program product of claim 15 wherein said program instructions further assign a first dcap insertion rate to a first one of the different logic cones which includes a first one of the functional cells having a first one of the candidate dcap regions forming the overlapping portion, and assign a second dcap insertion rate to a second one of the different logic cones which includes a second one of the functional cells having a first one of the candidate dcap regions forming the overlapping portion, the second dcap insertion rate being less than the first dcap insertion rate, wherein the dcap is inserted in the first candidate dcap region.

19. The computer program product of claim 15 wherein said program instructions further assign at least two different dcap insertion rates to the different logic cones, apply the different dcap insertion rates to the candidate dcap regions based on which logic cone contains the functional cell associated with the candidate dcap region, and construct a hypergraph by:

adding an edge to the hypergraph for each of the functional cells;

adding a node to the hypergraph for each of the candidate dcap regions, a given node being initially connected to one of the edges corresponding to the functional cell associated with the candidate dcap region corresponding to the given node;

removing any node from the hypergraph that corresponds to a candidate dcap region which overlaps another candidate dcap region having a higher dcap insertion rate; and connecting any edge previously connected to a removed node to the node corresponding to the candidate dcap region having the higher dcap insertion rate, wherein said inserting places the dcap in the candidate dcap region corresponding to one of the nodes having the greatest number of connected edges.

20. The computer program product of claim 19 wherein the hypergraph is further constructed by removing any edge from the hypergraph that corresponds to a functional cell whose associated candidate dcap regions all overlap other candidate dcap regions having higher dcap insertion rates.

21. The computer program product of claim 19 wherein the dcap is a first dcap, and said program instructions further update the hypergraph by removing all nodes having edges connected to the node corresponding to the candidate dcap region in which the first dcap is inserted, and insert in the description of the integrated circuit design a second dcap at another candidate dcap region corresponding to another one of the nodes which has the greatest number of connected edges after updating the hypergraph.

\* \* \* \* \*